Patented Apr. 16, 1940

2,197,146

UNITED STATES PATENT OFFICE 2,197,146

ORE TREATMENT

Hendrik W. B. de W. Erasmus, Lewiston, and Clarence E. Cormack, Buffalo, N. Y., assignors to Electro Metallurgical Company, a corporation of West Virginia No Drawing. Application March 24, 1939, Serial No. 263,890

11 Claims. (Cl. 75—1)

The invention relates to ore treatments and refers more particularly to the treatment of ores used in the manufacture of chromium, chromium alloys, and chromium compounds.

The principal source of chromium is chromite ore, which also contains iron in a proportion depending upon the grade of the ore. High grade ore is usually considered to be ore containing chromium and iron in a ratio of more than three parts of chromium to one of iron. Large deposits of chromium ore having a chromium to iron ratio of less than three to one are available, and there is a demand for a method of beneficiating these ores by raising the ratio of chromium to iron.

The principal object of this invention is a method of beneficiating chromite ores to raise the ratio of chromium to iron therein. Another object is a method of increasing the chromium to iron ratio of ores in which that ratio is less than three to one to three or more to one.

The invention comprises a method of treating chromite ore wherein the chromium to iron ratio of the ore is raised by the reduction of at least a portion of the iron oxide contained in the ore and by removing the iron so reduced, without reducing or removing any large part of the chromium content of the ore. The reduced iron is suitably removed by leaching with dilute mineral acid.

In accordance with the principles of the invention, the ore to be treated is first finely ground, preferably to pass a 100 mesh screen (0.15 mm. openings). It is then intimately mixed with a reducing agent. Suitable reducing agents are carbonaceous materials such as bituminous coal dust, coke dust; pitch; and the heavy, viscous residue of oil cracking processes. Of the carbonaceous reducing agents, bituminous coal dust is preferred.

When bituminous coal dust is employed as the reducing agent, the ore and coal dust are suitably mixed in a ratio between four and twenty parts of ore to one part of coal dust. For most purposes the ratio of ore to coal dust should be between ten to one and twenty to one, and a ratio of about thirteen to one is preferred. The mixture of ore and coal dust is heated in a suitable furnace until a substantial proportion of the iron oxide content of the ore is reduced. The reduction of iron oxide takes place comparatively rapidly at a temperature of about 1200° C., and the mixture is preferably heated at a temperature of about 1000° C. to 1300° C. for a time of about one to eight hours or until the desired reduction has occurred. After the reducing step, the ore-coal dust mixture may be quenched or cooled slowly. The mixture is preferably quenched in water, but may be cooled in any other way that will prevent re-oxidation of the iron.

After cooling, the treated ore is leached to remove the reduced iron. Any of several leaching agents may be employed but one which selectively dissolves the iron content of the ore without dissolving any substantial portion of the chromium content is preferred. Suitable leaching agents are members of the group consisting of sulphurous acid, carbonic acid, and mixtures thereof. Sulphurous acid is most satisfactory, and is preferably used in concentrations of about 7% or less. When carbonic acid is used, maximum concentration is preferred. The leaching period may be shortened if the agent is warmed and it may be further shortened by agitating the ore during leaching, but such heating and agitation are not essential.

The following examples of typical experiments embodying the principles of the invention are given by way of explanation and illustration but it will be apparent that variations and modifications may be made in the described procedure within the scope of the invention.

A chromite ore containing about 45.11% $Cr_2O_3$ and 23.78% of FeO, together with other constituents, was used. The total chromium content of the ore was 30.87%; the total iron content was 18.48%, and the chromium to iron ratio was 1.67 to 1. Four parts of this ore were finely ground and mixed with one part of finely ground bituminous coal dust. This mixture was heated for six hours at a temperature of about 1180° C., and was then leached with sulphurous acid. In the leaching step, 10.63% of the ore was dissolved as reduced iron, corresponding to 57.52% of the original iron content of the ore. The chromium to iron ratio of the ore was raised thereby from 1.67 to 1 to 3.91 to 1.

In another experiment using the same ore, 13 parts of the finely ground ore were mixed with one part of coal dust. The mixture was heated for two hours at a temperature of about 1200° C., and was then leached with sulphurous acid. In this case, 14.68% of the ore was dissolved as reduced iron, corresponding to 79.43% of the original iron content of the ore, and the chromium to iron ratio of the ore was raised from 1.67 to 1 to 7.28 to 1.

In a third experiment using the same ore, a mixture of 20 parts ore to one part coal was heated for three hours at 1200° C. On leaching with sulphurous acid, 6.9% of the ore was dissolved as reduced iron, corresponding to 37.33% of the original iron content of the ore. The chromium to iron ratio of the ore was thus raised to 2.65 to 1.

The process of the invention may be carried out in any suitable furnace. Where large amounts of ore are to be treated, an oven similar to the by-product coke oven may be used. In using a furnace of this type, the heated ore may be pushed out of the oven and quenched directly in the leaching agent. Such procedure has the advantage that the treated ore is protected from reoxidation and the leaching agent is warmed.

It will be apparent that the method of the invention is not limited to the treatment of ore but may be applied to any material containing substantial amounts of oxides of chromium and iron, such as chromium-rich slags, for example.

We claim:

1. Method of treating material containing oxides of chromium and iron which comprises reducing a substantial proportion of such iron oxides from the material without reducing any substantial proportion of such chromium oxides and removing the reduced iron by leaching with a selective solvent chosen from the group consisting of aqueous sulphurous acid, aqueous carbonic acid, and mixtures thereof.

2. Method of raising the ratio of chromium to iron in a chromium ore containing oxides of chromium and iron which comprises reducing a substantial proportion of the iron oxide content of the ore and removing the reduced material by leaching with a selective solvent chosen from the group consisting of aqueous sulphurous acid, aqueous carbonic acid, and mixtures thereof.

3. Method of treating ore containing compounds of chromium and iron which comprises heating such ore in the presence of a reducing agent, reducing at least a part of the iron content of the ore to iron without reducing a substantial proportion of the chromium content of the ore, and removing the iron so reduced by leaching with a selective solvent chosen from the group consisting of aqueous sulphurous acid, aqueous carbonic acid, and mixtures thereof.

4. Method of treating ore containing oxides of chromium and iron which comprises finely grinding such ore, heating it in the presence of a reducing agent which is capable of at least partially selectively reducing the oxides of iron, and removing at least a portion of the iron so reduced by leaching the ore with a selective solvent chosen from the group consisting of aqueous sulphurous acid, aqueous carbonic acid, and mixtures thereof.

5. Method of raising to at least 3 to 1 the ratio of chromium to iron in a chromium ore having a chromium to iron ratio of less than 3 to 1 which comprises heating such ore in the presence of a reducing agent, reducing at least a part of the iron oxide content of the ore without reducing a substantial portion of the chromium oxide content of the ore, and leaching the so treated ore with a selective solvent chosen from the group consisting of aqueous sulphurous acid, aqueous carbonic acid, and mixtures thereof to remove at least a part of the iron so reduced without removing a substantial proportion of chromium from the ore.

6. Method of raising to at least 3 to 1 the ratio of chromium to iron in a chromium ore having a chromium to iron ratio of less than 3 to 1 which comprises finely grinding such ore, heating the finely ground ore in the presence of a reducing agent, at least partially selectively reducing the iron oxide, and leaching the so treated ore with a selective solvent chosen from the group consisting of aqueous sulphurous acid, aqueous carbonic acid, and mixtures thereof, thereby removing the reduced iron without removing a substantial proportion of chromium from the ore.

7. Method of raising to at least 3 to 1 the ratio of chromium to iron in a chromium ore having a chromium to iron ratio of less than 3 to 1 which comprises finely grinding such ore, heating the finely ground ore in admixture with a carbonaceous reducing agent, reducing at least a part of the iron oxide content of the ore, without reducing any substantial proportion of the chromium oxide content of the ore, and leaching the so treated ore with a selective solvent chosen from the group consisting of aqueous sulphurous acid, aqueous carbonic acid, and mixtures thereof, thereby removing the reduced iron without removing a substantial proportion of chromium from the ore.

8. Method of treating chromite ore which comprises heating such ore in admixture with a reducing agent at a temperature of about 1000° C. to 1300° C. for a time between about one hour and eight hours, reducing a substantial proportion of the iron oxide content of such ore, without reducing any substantial proportion of the chromium oxide content of the ore, and removing the reduced material from the ore by leaching with a solvent chosen from the group consisting of aqueous sulphurous acid, aqueous carbonic acid, and mixtures thereof.

9. Method of raising to at least 3 to 1 the chromium to iron ratio of a chromite ore having a chromium to iron ratio of less than 3 to 1 which comprises finely grinding such ore, intimately mixing the ground ore with a carbonaceous reducing agent in the proportion of about 10 to 20 parts ore to 1 part reducing agent, heating the mixture of ore and reducing agent to a temperature of about 1000° C. to 1300° C. for a time between about 1 hour and 8 hours, reducing a substantial proportion of the iron oxide content of the ore, without reducing any substantial proportion of the chromium oxide content of the ore, and removing the reduced iron by leaching with a selective solvent chosen from the group consisting of aqueous sulphurous acid, aqueous carbonic acid, and mixtures thereof.

10. Method of raising the ratio of chromium to iron in a material containing oxides of chromium and iron which comprises reducing a substantial proportion of the iron oxide content of the ore and removing iron so reduced by leaching the material with aqueous sulphurous acid.

11. Method of raising to at least 3 to 1 the ratio of chromium to iron in a chromium ore having a chromium to iron ratio of less than 3 to 1 which comprises finely grinding such ore, heating the finely ground ore in admixture with a carbonaceous reducing agent thereby reducing at least a portion of the iron oxide content of the ore, without reducing any substantial proportion of the chromium oxide content of the ore, and leaching the so treated ore with aqueous sulphurous acid.

HENDRIK W. B. DEW. ERASMUS.
CLARENCE E. CORMACK.